US007558201B2

(12) United States Patent
Sang et al.

(10) Patent No.: US 7,558,201 B2
(45) Date of Patent: Jul. 7, 2009

(54) MEASUREMENT-BASED ADMISSION CONTROL FOR WIRELESS PACKET DATA SERVICES

(75) Inventors: Aimin Sang, Piscataway, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 629 days.

(21) Appl. No.: 11/278,154

(22) Filed: Mar. 31, 2006

(65) Prior Publication Data

US 2007/0230335 A1 Oct. 4, 2007

Related U.S. Application Data

(60) Provisional application No. 60/743,004, filed on Dec. 1, 2005.

(51) Int. Cl.
*G01R 31/08* (2006.01)
(52) U.S. Cl. .................. 370/230; 370/232; 370/338
(58) Field of Classification Search ............... 370/229, 370/230, 232, 310, 328, 329, 338; 455/403, 455/422.1, 435.1, 435.2, 435.3, 450, 452.1, 455/452.2
See application file for complete search history.

(56) References Cited

U.S. PATENT DOCUMENTS

| 6,917,812 | B2 * | 7/2005 | Damnjanovic ........... 455/452.2 |
| 7,023,825 | B1 * | 4/2006 | Haumont et al. ............ 370/338 |
| 7,385,920 | B2 * | 6/2008 | Zhang et al. ................. 370/229 |

* cited by examiner

*Primary Examiner*—Ricky Ngo
*Assistant Examiner*—Paul Masur
(74) *Attorney, Agent, or Firm*—Joseph J. Kolodka; Brosemer, Kolefas & Associates (57) ABSTRACT

A call admission control technique is described which is well-suited for wireless systems providing real-time services over a shared downlink. The call admission control technique considers both multiplexing and multi-user diversity gain. The technique accurately determines the multi-user diversity gain by measuring per-user resource allocation and advantageously maximizes user accommodations under quality-of-service (QoS) as well as location-dependent resource availability constraints. In a further aspect, the call admission control technique is combined with delay-based scheduling, which effectively balances between system efficiency (channel exploitation) and user expectation (e.g., QoS). A system embodying the described call admission control and scheduling techniques can advantageously deliver efficient real-time services and remain robust to different load scenarios that vary according to system dynamics and/or user mobility.

17 Claims, 4 Drawing Sheets

MEASUREMENT-BASED ADMISSION CONTROL FOR WIRELESS PACKET DATA SERVICES

CROSS REFERENCE TO RELATED APPLICATIONS

This application claims the benefit under 35 U.S.C. § 119 (e) of U.S. Provisional Application No. 60/743,004 filed Dec. 1, 2005, the entire contents and file wrapper of which are hereby incorporated by reference for all purposes into this application.

FIELD OF THE INVENTION

The present invention relates generally to admission control techniques and, in particular, to admission control for users of a wireless packet data system.

BACKGROUND INFORMATION

Next generation wireless systems are expected to support demanding applications such as real-time services. Real-time services over a shared downlink channel require not only a real-time scheduler but also efficient admission control, commonly referred to as as call admission control (CAC). (Note that, as used herein, the term "call" is not limited to a telephone call or any specific media type.) Admission control decides whether the system has the resources to accommodate a newly arrived user or call, such as a streaming video or VoIP request, without sacrificing the quality of service (QoS) of existing users. The CAC function is particularly important to systems such as cellular wireless systems in which users are continuously entering and leaving cellular coverage while meeting requirements for guaranteed services for each user. Admission control is an indispensable part of the system and one of the key components driving QoS in such systems. Admission control directly decides how efficient the system could be, i.e., how many real-time users the wireless system can support. As such, admission control will have a significant impact on users' satisfaction and thus system revenues.

There is a large selection of underlying, packet-level scheduling approaches, including the proportional fairness (PF), modified largest weighted delay first (MLWDF), and exponential rule (Exp-Rule) algorithms. Besides MLWDF and Exp-Rule, however, few real-time scheduling algorithms are designed specifically for shared-channel cellular systems. See M. Andrews et al., "Providing Quality of Service over a Shared Wireless Link," IEEE Commun. Mag., pp. 15054 (February 2001); S. Shakkottai and A. Stolyar, "Scheduling Algorithms for Mixture of Real-time and NonReal-time Data in HDR," in Proceedings 17th Int. Teletraffic Congress (ITC17) (September 2001). The MLWDF and Exp-Rule algorithms are both a weighted versions of PF, where per-user weight equals the head-of-line (HOL) packet delay. While they have been shown to be "throughput optimal", they are not necessarily delay optimal.

In wired networking systems, the earliest due date (EDD) and the shortest time to extinction (STE) algorithms have been shown to be optimal to minimize the mean queuing delay and the deadline-violated packet losses, respectively. On the other hand, FIFO queuing as the simplest scheduling algorithm is known to minimize the maximal queuing delay. For the simple case that all arrived packets have the same expiration time $D_s$, the EDD algorithm and FIFO queuing become equivalent. These approaches, however, have low efficiency in the cellular environment due to their lack of channel awareness.

With regard to admission control, in contrast to the numerous admission control techniques applicable to legacy circuit-switched cellular systems, where each user has a power-controlled dedicated channel, there have been few techniques for dealing with flow or user-level admission control in cellular downlink shared channel systems. At the flow level, only a few admission control techniques have been proposed for such systems. See T. Bonald and A. Proutiere, "Wireless Downlink Data Channels: User Performance and Cell Dimensioning," Proceedings of ACM MOBICOM, pp. 33952 (September 2003); S. Das, H. Viswanathan, G. Rittenhouse, "Dynamic Load Balancing Through Coordinated Scheduling in Packet Data Systems," IEEE Proceedings of INFOCOM, pp. 78696 (April 2003).

The aforementioned approaches, however, suffer from inefficiencies due to their neglect of multi-user diversity gain at the scheduler (or packet) level. To take advantage of multi-user diversity gain, a sender should choose the receiver with the best channel quality in order to maximize the system spectral efficiency. On the other hand, there are several channel-dependent, opportunistic scheduling algorithms to exploit such gain with or without delay awareness. These scheduling approaches, however, assume a fixed number of users or a system of static traffic loads.

Particularly in cellular systems, there are significant challenges in accurately capturing the load of each user and of the whole system given the location-dependent and user-specific channel quality and in characterizing the per-user QoS and wireless resource given an opportunistic scheduler.

SUMMARY OF THE INVENTION

In a first aspect, the present invention provides a call admission control technique for a wireless system with a shared downlink channel. An exemplary embodiment of a call admission control technique of the present invention considers both multiplexing and multi-user diversity gain, with the latter being captured accurately by an online or real-time measurement of per-user resource allocation. The admission control technique of the present invention advantageously maximizes user accommodations under a QoS constraint (e.g., per-user expectation of profile rate), and the constraint of location-dependent resource availability.

In a further aspect, the present invention combines the aforementioned call admission control with delay-based scheduling, referred to herein as maximum cost deduction (MCD) scheduling. Several exemplary embodiments of schedulers are described which effectively balance between system efficiency (channel exploitation) and user expectation (e.g., QoS). A first scheduler implementation, referred to as real-time MCD (rt-MCD), minimizes a delay-derived cost function of backlogged packets at the smallest timescale (e.g., at the slot level). A second scheduler implementation, referred to as non-real-time MCD (nrt-MCD), balances between real-time delay reduction and non-real-time (i.e., large timescale) per-user fairness.

The call admission control and scheduling techniques of the present invention effectively exploit multi-user diversity gain through accurate measurements of the radio resources allocated to each user. Together they provide high system efficiency and a balance between flow-level QoS (e.g., aggregate "goodput," blocking rate of newly arrived users) and packet-level QoS (e.g., packet queuing delay or loss). A system embodying call admission control and scheduling in accordance with the present invention can advantageously deliver efficient real-time services and remain robust to different load scenarios that vary according to system dynamics and/or user mobility.

The aforementioned and other aspects and advantages of the present invention will be apparent to those of ordinary skill in the art by reference to the following detailed description and accompanying drawings.

DETAILED DESCRIPTION

Several performance metrics will be referred to herein in describing the present invention. "Per-user goodput" refers to the transmission rate of real-time packets delivered successfully before their deadline. Conversely, the loss rate of real-time packets refers to the percentage of packets dropped at the base station due to deadline-expiration or delay violation. The mean delay and jitter of successfully delivered real-time packets are also relevant metrics. The per-user goodput and mean delay and jitter metrics can also be measured for all users in aggregation to reflect overall system performance.

Another metric is the call blocking rate for users dynamically arriving at randomly distributed locations in a cell. From the system's point of view, this metric also reflects the maximum number of admissible users under the system's packet-level quality-of-service (QoS) constraints. The performance fairness of multiple real-time users, i.e., how the goodputs of users admitted to the system differ from their expectations of profile rate is indicative of system robustness. This metric is less delay-sensitive and is thus referred to as a non-real-time metric.

It is assumed that each real-time user specifies stringent QoS requirements at the packet level, and a nominal profile rate at the flow level. While the stringent QoS metrics, such as packet delay and losses, are monitored at each time slot, the profile rate corresponds to the minimum or average streaming rate over a relatively long period. Due to volatile channel fading and bursty traffic/user arrivals, as well as high user mobility in a cellular environment, it is extremely challenging to provide a strict QoS guarantee, if feasible at all. Therefore, a practical system will attempt to maintain a balance among system efficiency, packet-level QoS, and flow-level performance.

Another consideration is the robustness of the system against abnormal conditions; for example, whether the packet-level QoS of users who are admitted during a stable or piecewise stationary period is still acceptable in case of abnormality. A system should preferably be robust under different loading scenarios and degrade in a predictable manner in case of user mobility or system (load) dynamics.

A brief summary of system and QoS parameters used herein will now be provided.

$Q_{k,s}(t) = \{0, \ldots, i, \ldots n_{k,s}(t)\}$

This is the set of backlogged packets at a cellular base station FIFO queue. Each packet is identified by $p_{k,s}^i(t)$ with i being the packet index number, s the class ID, and k the user ID of the intended recipient, at a time t. The index i=0 refers to an empty queue, i=1 the head-of-line (HOL) packet, and i=$n_{k,s}(t)$ the last packet in the FIFO queue.

$\mathcal{Q}_{k,s}(t)$

The subset of $Q_{k,s}(t)$ denoting the packets that are selected for transmission from the base station FIFO queue at time t.

$l_{k,s}^i(t)$

The length (e.g., in bits) of the packet $p_{k,s}^i(t)$.

$\Delta l_{k,s}^i(t)$

The length (e.g., in bits) of that segment of packet $p_{k,s}^i(t)$ that has already been transmitted.

$m_{k,s}$ and $m_k$

The average profile rate or minimum rate expectation for a real-time flow for a single class s or all classes of user k, respectively (e.g., in kbps). $m_k$ is a summation of $m_{k,s}$ among all the active flows to user k.

$D_s$

The delay budget of each packet from class s arriving at the cellular base station.

$d_{k,s}^i(t)$

The queuing delay of packet $p_{k,s}^i(t)$ since its initial arrival at the base station.

This parameter includes the retransmission delay. Packet retransmissions have a higher priority than first-time transmissions.

$\beta_s$

This is the upper bound of packet losses (as a fraction of totally arrived packets) due to deadline violations, defined as:

$$P(d_{k,s}^i(t) \geq D_s) \leq \beta_s, \forall k \text{ and } \forall i. \quad (1)$$

Each real-time packet upon violating the condition $d_{k,s}^i(t) \geq D_s$ will be removed immediately from the buffer, and thus be counted as a lost packet.

$T_{k,s}(t)$ and $T_k(t)$:

$T_{k,s}(t)$ is the online measured average goodput in kbps for class s of user k.

$T_k(t) = \Sigma_{s=1}^{S} T_{k,s}(t)$ indicates the per-user goodput.

$I_k(t)$

A binary indicator of the scheduling decision for user k at time t. $I_k(t)=1$ indicates that user k is scheduled at time t, and $I_k(t)=0$ otherwise.

$B_k(t)$

This parameter represents the average radio resources (e.g., bandwidth) allocated to user k at time t, where, in an exemplary embodiment:

$$B_k(t+1) = \left(1 - \frac{1}{t_l}\right)B_k(t) + \frac{1}{t_l}r_k(t)I_k(t). \quad (2)$$

$r_k(t)$ is the instantaneous channel rate of user k and $t_l$ is the width of a smoothing window at a large timescale, e.g., $t_l$=1,000 time slots.

With the above framework as a backdrop, several exemplary embodiments of the present invention will now be described in detail.

Figure 1:
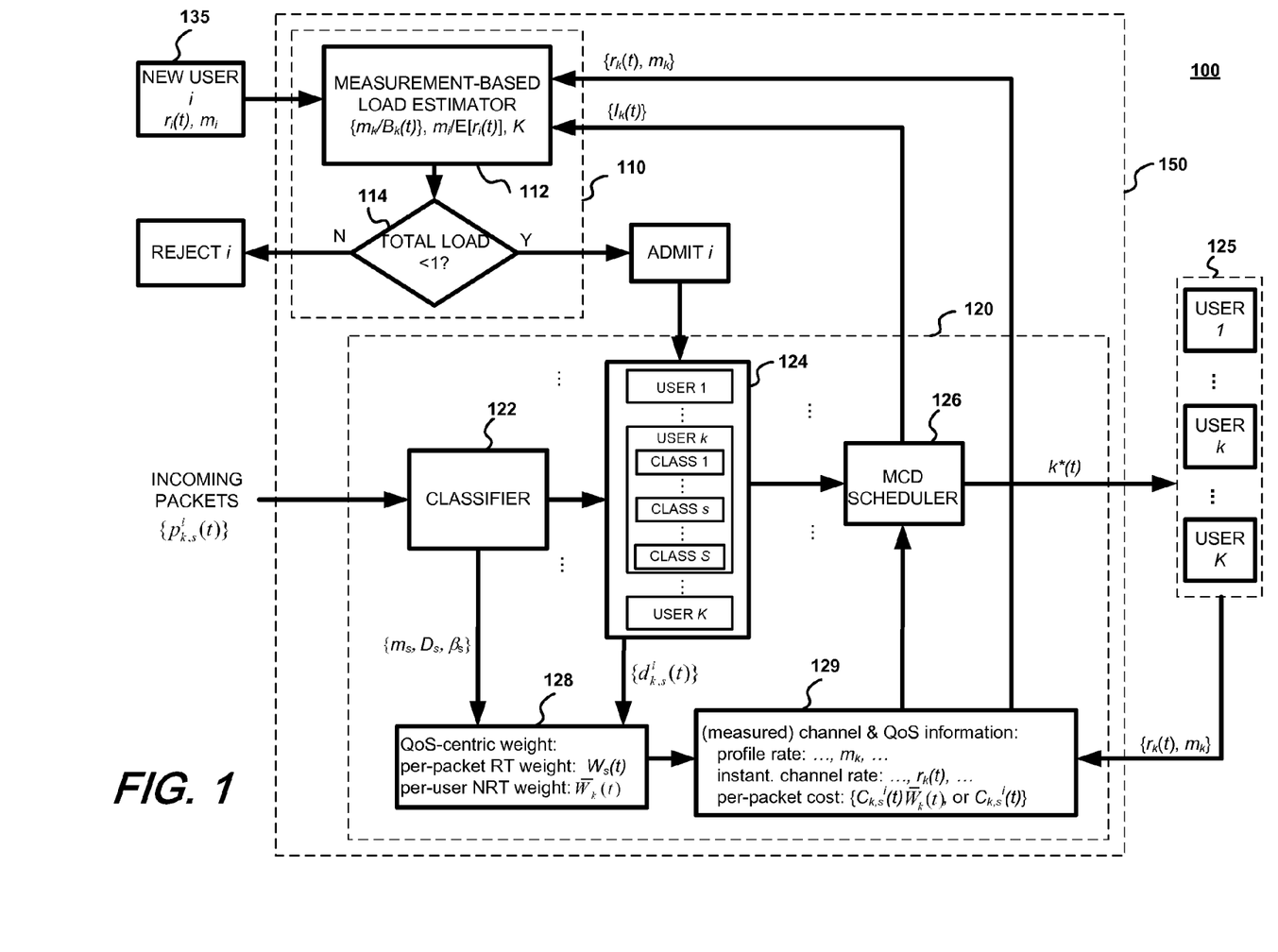
FIG. 1 schematically illustrates an exemplary embodiment of a shared-channel downlink wireless communications system comprising a call admission controller and a scheduler in accordance with the present invention.

FIG. 1 schematically illustrates an exemplary shared-channel downlink cellular system 100 comprising a call admission control (CAC) block 110, and a scheduling block 120. The CAC block 110 and scheduling block 120 may be located, for example, at a base station 150 of the cellular system but may also be co-located with other components of a cellular communications system, including, for example, a radio network controller (RNC), among others. Moreover, the CAC 110 and scheduling block 120 need not be co-located. For example, the CAC 110 may be located at an RNC and operate in conjunction with multiple schedulers located at multiple base stations.

Exemplary implementations of the CAC block 110 and scheduling block 120 are described in greater detail below.

At any time, the base station 150 will be providing service to a set 125 of admitted users $\{1, \ldots, K\}$ when a new user 135 (designated "user i") requests admission. The CAC block 110 makes a determination to admit or reject each newly arrived user 135, in accordance with the present invention. In the context of wireless cellular communications, each "user" interacts with the system 100 via a "mobile station" and as such the terms are meant to be used interchangeably.

The CAC block 110 includes a measurement-based load estimator 112 and a decision block 114. The scheduling block 120 includes a packet classifier 122, a packet buffer 124, a maximum cost deduction (MCD) scheduler 126, and processing blocks 128 and 129.

In operation, incoming packets (i.e., downstream packets $p_{k,s}^{i}(t)$ received by the system for conveyance to the admitted users 1 . . . K) are received by the base station 150 and provided to the classifier 122. The classifier 122 determines the class s to which each packet belongs. Each user k may have up to S classes of flows. In addition, the classifier 122 maps incoming packets' class identifiers to class-specific parameters: profile rate $m_s$, delay budget $D_s$, and the packet-loss upper bound $\beta_s$. These class-specific parameters are provided to processing block 128, as described in greater detail below.

Packets from each class s are queued in the packet buffer 124 for each user k. The classes of flows are preferably sorted in decreasing order of delay tolerance. In an exemplary embodiment, the buffer 124 is a first-in-first-out (FIFO) buffer of sufficient space to avoid (frequent) buffer overflow.

The buffer 124 determines the queuing delay $d_{k,s}^{i}(t)$ from the buffered packets and throughput history, and provides them to the processing block 128. The processing block 128 uses the information obtained from the classifier 122 and the buffer 124 to calculate a real-time delay-based weight function $W_s(d_{x,s}^{i}(t))$ or a non-real-time rate-based weight function $\overline{W}_k(t)$, depending on the implementation of the scheduler, as described in greater detail below.

It is assumed that each real-time flow is policed at its network ingress according to its profile rate $m_{k,s}$ and that each arriving packet has been labeled properly with differentiated services (DiffServ) codepoint, as described, for example in, S. Blake et al., "An Architecture for Differentiated Services," Internet Engineering Task Force (IETF), Request for Comments 2475 (December 1998). The real-time flows, e.g., video or audio streaming, are typically carried by IP/UDP/RTP protocols. For example, an ITU G.729 encoded Voice over IP (VoIP) source generates 50 packets per second, with a raw or compressed profile rate of approximately 24 kbps or 12 kbps. On the other hand, an ITU H.263 encoded video source generates a less time critical traffic at 25 frames/second with a profile rate of approximately 64 kbps. The end-to-end delay tolerance of each RT packet is about 150 ms to 200 ms. As the last hop, the cellular access may be assigned a fixed delay budget ($D_s$) of approximately 40-80 ms, for example.

At each time slot t, the MCD scheduler 126 selects a "best" user k* for packet transmission from the set 125 of admitted users $\{1, \ldots, K\}$ based on the QoS and queuing information of backlogged packets, the profile rates $\{m_k\}$ and instantaneous channel rates $\{r_k(t)\}$ of all users, and the per-packet "cost," $C_{k,s}^{i}(t)\overline{W}_k(t)$ or $C_{k,s}^{i}(t)$, as described in greater detail below. As shown in FIG. 1, these parameters are provided to the MCD scheduler 126 from processing block 129. The shared-channel downlink is dedicated to the best user k*(t) for the time slot t; i.e., it is that user to which queued packets in the buffer 124 are transmitted during that time slot.

For purposes of illustration only, time-division-multiplexed (TDM) channel access is assumed, although the present invention is not limited to any particular access scheme or specific system architecture.

As shown in FIG. 1, the load estimator 112 of the CAC block 110 receives from the scheduler 126 the instantaneous scheduling decision set $\{I_k(t)\}$ and uses it and the instantaneous channel rate of each user $r_k(t)$ to determine the parameter $B_k(t)$, the average per-user radio resource allocation for each admitted user, in accordance with (2) above. The load estimator 112 uses the set $\{B_k(t)\}$, the profile rates of the admitted users ($m_k$) and of the new user 135 ($m_i$), the instantaneous channel rate of each user $\{r_k(t)\}$, and the estimated instantaneous channel rate of the new user $E[r_i(t)]$ to generate a normalized system load estimate. If it is determined at decision block 114 that the normalized load estimate is less than 1, the new user is admitted a per-user queue is created for the new user in the buffer 124. Once admitted, downstream packets for the new user are queued in the buffer 124, as described above. If it is determined at 114 that the normalized load estimate with the new user is 1 or greater, the new user is denied admission. Several exemplary embodiments of the CAC block 110 and their operation are described below in greater detail.

The present invention can be readily implemented in a wide array of systems, including, without limitation, third generation (3G) cellular systems such as the CDMA2000 High Data Rate (HDR) system and the WCDMA High Speed Data Packet Access (HSDPA) system. The present invention is also not limited to any specific service offering, although the present invention would be particularly advantageous to real-time services, including, for example, MPEG4 or H.263 encoded video streaming to mobile cellular users. Both systems adopt a shared downlink channel to support multiple users of heterogeneous expectations of real-time quality of service (QoS). The present invention advantageously provides for robust and efficient control of mobile users accessing such channel, with awareness of heterogeneous QoS expectations and location-dependent channel states of multiple users.

The call admission controller of the operation can operate in conjunction with any scheduler that provides substantially instantaneous scheduling decisions. Several exemplary embodiments of the call admission controller and scheduler used in the above-described system will now be described in detail.

Channel-Dependent, Measurement-Based CAC

Referring to FIG. 1, for a system with K existing real-time users and a newly arrived user i, the following expression can be used to derive several call admission control algorithms:

$$\underbrace{\sum_{k=1}^{K} \frac{m_k}{E[r_k(t)]} + \frac{m_i}{E[r_i(t)]}}_{L_1(t)} \leq \quad (3)$$

$$\underbrace{(K+1) \max_{\forall k \in \{1, \ldots, K\}, i} \left\{ \frac{m_k}{E[r_k(t)]}, \frac{m_i}{E[r_i(t)]} \right\}}_{L_2(t)} \leq 1 \leq G(K+1).$$

In (3), the quantity "1" represents the normalized full channel capacity. G(K+1) is the multi-user diversity gain which can be achieved with an opportunistic scheduler, such as described in greater detail below. $E[r_k(t)]$ and $E[r_i(t)]$ are the per-user mean channel rate for an existing user k and the new user i, respectively. These parameters can be readily measured based on channel feedback.

$$\frac{m_k}{E[r_k(t)]} \text{ and } \frac{m_i}{E[r_i(t)]}$$

are the per-user load exerted on the shared channel by an existing user k and the new user i, respectively. This metric of load considers both QoS expectations (e.g., profile rate) and user-specific channel quality (radio resource availability).

A variety of CAC algorithms can be derived from (3). For example, if total system load is defined as the term $L_2(t)$ above and system capacity as 1, the following CAC algorithm is derived, wherein a user i is admitted if:

$$(K+1), \max_{\forall k \in \{1, \ldots, K\}, i} \left\{ \frac{m_k}{E[r_k(t)]}, \frac{m_i}{E[r_i(t)]} \right\} \leq 1. \quad (4)$$

This algorithm, however, may be conservative for some applications because the system load is determined by the "worst" case of per-user loads.

Defining total system load as the term $L_1(t)$ in (3) above and system capacity as 1 yields a further CAC algorithm, denoted herein as CAC0, in which user i is admitted if:

$$\sum_{k=1}^{K} \frac{m_k}{E[r_k(t)]} + \frac{m_i}{E[r_i(t)]} \leq 1 \quad (5)$$

The CAC0 algorithm exploits the multiplexing gain of multiple real-time users, but not multi-user diversity gain.

Another exemplary CAC algorithm that can be derived from (3) is the following:

$$\sum_{k=1}^{K} \frac{m_k}{E[r_k(t)]} + \frac{m_i}{E[r_i(t)]} \leq G(K+1). \quad (6)$$

This algorithm, designated herein as CAC1, considers both multi-user diversity and multiplexing gain. The term G(K+1), however, is analytically intractable in practice, except for certain special cases. For example, it has been shown that $$G(K) = \sum_{k=1}^{K} \frac{1}{k}$$

when the proportional fairness (PF) scheduling algorithm is used and when the normalized channel rate $$\frac{r_k(t)}{E[r_k(t)]}$$

of all users is a linear function of the SNR and is identical and independently distributed (IID). By setting $$G(K) = \sum_{k=1}^{K} \frac{1}{k},$$

the CAC1 algorithm tends to be aggressive.

A further exemplary CAC algorithm can be expressed as follows, in accordance with a user i is admitted if:

$$\sum_{k=1}^{K} \frac{m_k}{(K+1)B_k(t)} + \frac{m_i}{E[r_i(t)]} \leq 1. \quad (7)$$

The algorithm expressed in (7) is herein designated CAC2. As can be seen, CAC2 bases the admission decision on the measured per-user load, $$\frac{m_k}{(K+1)B_k(t)},$$

summed over all existing users $\{1, \ldots, K\}$, and on the estimated load, $$\frac{m_i}{E[r_i(t)]},$$

for the new user i.

As discussed above, $B_k(t)$ represents the average radio resources (e.g., bandwidth) allocated to user k at time t, where:

$$B_k(t+1) = \left(1 - \frac{1}{t_l}\right) B_k(t) + \frac{1}{t_l} r_k(t) I_k(t). \quad (2)$$

$t_l$ is the width of a smoothing window at a large timescale, e.g., $t_l$=1,000 time slots.

The measurement of $B_k(t)$ enables a call admission controller implemented in accordance with the CAC2 algorithm to accurately capture the multi-user diversity gain, if any, which is inherently incorporated in the (radio) bandwidth resource by the scheduler. In particular, this measurement is independent of channel distribution and is not limited to any specific scheduling algorithm. By contrast, the per-user goodput $T_k(t)$ is bounded by limited traffic arrival in lightly loaded systems and thus does not accurately characterize the bandwidth resource. Note that for real-time flows of limited packet arrivals, $B_k(t) \geq T_k(t)$, where the equality holds only for heavily backlogged users.

Moreover, CAC2 avoids using G(K), which as mentioned, could be analytically intractable and thus inaccurate to estimate.

Test results set forth below show that CAC2 represents a good compromise between CAC0, which tends to be conservative, and CAC1, which tends to be aggressive.

Delay-Based Scheduling

A system in accordance with the present invention can be implemented with a variety of schedulers, both real-time and non-real-time. Several schedulers that can be used in exemplary embodiments of the present invention are described in U.S. patent application Ser. No. 11/276,381 filed on Feb. 27, 2006 and incorporated herein by reference in its entirety.

For the scheduling of non-real-time (NRT) data services, resource fairness and aggregate system throughput are typically the primary concerns. Existing NRT scheduling algorithms, such as maxC/I, and proportional fairness (PF) focus on channel state exploitation under the assumption of infinite data backlog. Those algorithms, however, cannot guarantee real-time packet delay or loss, thus resulting in poor goodput. This is due to their neglect of dynamic traffic backlog and their lack of consideration of real-time packet delay in the backlog. Resource fairness becomes a secondary issue in real-time services.

Existing real-time schedulers for third generation (and beyond) cellular systems, such as the modified largest-weighted delay first (MLWDF) and the exponential rule (Exp-Rule) schedulers, effectively integrate real-time packet delay guarantee with multi-user diversity gain. Given their performance in packet loss reduction, their goodput and robustness are limited by their underlying mechanism for resource fairness. The schedulers described herein deliver comparable or better real-time services and are robust in a wide range of system loading scenarios.

Packet arrivals of real-time flows are random, sporadic, and bursty. A good real-time scheduler should provide regular, timely service to backlogged packets, because excessive delay of those packets may cause deadline violations and thus packet losses, leading to insufficient data backlogs and reduced goodput.

A downlink scheduler can achieve high system efficiency by exploiting multi-user diversity gain. Unfortunately, for any user, the peaks in channel quality hardly coincide with the peaks of backlogs or queueing delay. Therefore, a real-time scheduler should preferably strike a balance between those users with good reception and those with time-critical flows. At each time slot, the scheduler should transmit the most expiring packets to the maximum of channel capacity, thereby yielding the maximum cost deduction (MCD) from the system. In other words, an MCD scheduler pursues the following target at each time slot:

$$\max \{\text{delay-derived cost of departing packets}\}. \quad (8)$$

The system cost function can be defined as the total cost of all backlogged packets, which can be expressed as follows:

$$C(t) = \sum_{k=1}^{K} \left[ \sum_{s=1}^{S} \sum_{i=0}^{n_{k,s}(t)} C_{k,s}^i(t) \right], \quad (9)$$

where $C_{k,s}^i(t)$ denotes the per-packet cost for each queued packet $p_{k,s}(t)$ at time t.

A successfully delivered real-time packet is one that has its entire contents transmitted to its intended recipient before its deadline expires. The cost of delaying a larger packet or a partially delivered packet is greater than the cost of delaying a smaller packet or a packet that has yet to be transmitted. Therefore, the per-packet cost function $C_{k,s}^i(t)$ should be a function of the size of the whole packet $l_{k,s}^i(t)$, the size of any transmitted segments of the packet $\Delta l_{k,s}^i(t)$, and the queuing delay $d_{k,s}^i(t)$. The per-packet cost function $C_{k,s}^i(t)$ should increase monotonically with $l_{k,s}^i(t)$ and $\Delta l_{k,s}^i(t)$. $C_{k,s}^i(t)$ should also increase monotonically with $d_{k,s}^i(t)$ and approach its maximum as $d_{k,s}^i(t)$ approaches the delay budget, $D_s$; i.e., when the packet is to be dropped from the queue due to a delay violation. Moreover, $C_{k,s}^i(t)$ should differentiate packets of the same class s in accordance with their delay and should also differentiate packets according to class.

Taking into account the aforementioned features, a suitable per-packet cost function can be defined as follows:

$$C_{k,s}^i(t) = W_s(d_{k,s}^i(t)) l_{k,s}^i(t) \left[ 1 + \frac{\gamma \Delta l_{k,s}^i(t)}{l_{k,s}^i(t) + \Delta l_{k,s}^i(t)} \right] \quad (10)$$

where $\gamma \geq 0$ is a factor weighting the length of the packet segment already transmitted segment $\Delta l_{k,s}^i(t)$ into the per-packet cost and $W_s(d_{k,s}^i(t))$ is the unit cost per bit. The unit cost per bit, $W_s(d_{k,s}^i(t))$, is a non-decreasing weight function of the delay $d_{k,s}^i(t)$ and is specific to each class s. This parameter is described in greater detail below.

As mentioned, the present invention contemplates a variety of schedulers. A first such scheduler is a real-time, maximum cost deduction (rt-MCD) scheduler with a delay-based weight function. A second is a non-real-time MCD (nrt-MCD) scheduler with a rate-based weight function. Each of these will now be described in greater detail.

At time slot t, the rt-MCD scheduler first scans the set of admitted users, $\{1, \ldots, k, \ldots, K\}$ to locate the set of backlogged real-time users, designated $\{1, \ldots, x, \ldots X\}$. If there are no backlogged users, as when, for example, the data backlogs are depleted or the system is lightly loaded, the scheduler operates as if all users have infinite data backlog and all packets have equal weights.

If however, there are backlogged users, the scheduler finds the user $x^*(t)$ according to their contribution to cost reduction as follows:

$$\Delta C(t) = \max_{I_x(t)} \left\{ \max_{\{Q_{x,s}(t)\}} \left[ \sum_{s=1}^{S} \sum_{\forall i \in Q_{x,s}(t)} I_x(t) C_{x,s}^i(t) \right] \right\} \quad (11)$$

subject to the following conditions:

$$\sum_{x=1}^{X} I_x(t) = 1, \text{ and } \sum_{s=1}^{S} \sum_{\forall i \in \underline{Q}_{x,s}(t)} l_{x,s}^i(t) \leq r_x(t)\Delta t, \quad (5)$$

where $\underline{Q}_{x,s}(t)$ is the subset of $Q_{x,s}(t)$ of packets that are selected for transmission from the queue of backlogged packets (also referred to as the "(x, s) queue").

An exemplary procedure for determining x*(t) in accordance with (11) entails two optimization steps. For each user x, the scheduler first pursues the intra-user or inter-class cost deduction by scanning the set of backlogged packets $Q_{x,s}(t)$, ($\forall s$) for each user x to determine the most "time-critical" subset $\underline{Q}_{x,s}(t)$ that is transmissible by instantaneous channel rate $r_x(t)$, i.e., it selects packets from the mixed classes as follows:

$$\{\underline{Q}_{x,s}(t)\} = \arg\max_{\{\underline{Q}_{x,s}(t)\}} \sum_{s=1}^{S} \sum_{\forall i \in \underline{Q}_{x,s}(t)} C_{x,s}^i(t). \quad (12)$$

If no packet segmentation is allowed, i.e., $\Delta l_{x,s}^i(t)=0$ and $C_{x,s}^i(t)=W_s(d_{x,s}^i(t))l_{x,s}^i(t)$, then the packet selection problem of (12) becomes an NP-hard Knapsack problem. This problem can be solved with approximation: the scheduler selects packets starting from the head of a sorted list, where packets from all the classes/queues of user x are ranked in accordance with decreasing values of $W_s(d_{x,s}^i(t))$. The selection continues until the list depletes or capacity is filled up by the selected packets. The complexity of the approximation is $\mathcal{O}(N \log N)$, where N is the total number of queued packets of user x.

If, however, packet segmentation is allowed, the scheduler first sorts the packets from all real-time classes in a single list of decreasing $$\frac{C_{x,s}^i(t)}{l_{x,s}^i(t)}.$$

Starting from the head of the list, the scheduler selects packets or segments until the queue depletes or the channel capacity is filled up (with $r_x(t)\Delta t$ bits). Note that the last selected "packet" may only be a segment, i.e., the packet will be partially transmitted.

Given the selected packets $\{\underline{Q}_{x,s}(t), \forall s\}$ for each user x, the scheduler then proceeds to maximize the inter-user cost deduction by finding the optimal user x*(t) that potentially delivers the largest cost deduction based on the previous intra-user packet selection:

$$x*(t) = \arg\max_{x} \sum_{s=1}^{S} \sum_{\forall i \in \underline{Q}_{x,s}(t)} C_{x,s}^i(t). \quad (13)$$

The scheduling decision is $I_x*(t)=1$ and $I_x(t)=0$ for all other x.

With an rt-MCD scheduler as described, good QoS performance can be achieved using a linear or an exponential delay-based weight function $W_s(d_{x,s}^i(t))$. A linear weight function, i.e., $$W_s(d_{k,s}^i(t)) = \frac{d_{k,s}^i(t)}{D_s}$$

yields a linear per-packet cost function. Note that the delay is normalized by the class-specific delay budget $D_s$ to get class-independent weight for comparison purposes:

$$C_{k,s}^i(t) = d_{k,s}^i(t)l_{k,s}^i(t)\left[1 + \frac{\gamma \Delta l_{k,s}^i(t)}{l_{k,s}^i(t) + \Delta l_{k,s}^i(t)}\right] \quad (14)$$

An rt-MCD scheduler with a linear delay-based weight function is designated herein as an rt-MCD-linear scheduler.

An exponential weight function, i.e., $W_s(d)=ae^{bd/D_s}$, where a and b can be constant or time-varying, reflects an ever-growing marginal increase of unit delay cost when packets are increasingly "time-critical", i.e., when $d \rightarrow D_s$. In an exemplary embodiment, a=b=1.

An rt-MCD scheduler with an exponential delay-based weight function is designated herein as an rt-MCD-exp scheduler.

As a special case, an rt-MCD-exp scheduler becomes an Exp-Rule scheduler if $$a = \frac{-\ln \beta_s}{D_s E[r_k(t)]}, \text{ and } b = \frac{D_s \delta_s}{1 + \sqrt{\frac{\sum_k \sum_s d\delta_s}{K}}}.$$

See S. Shakkottai and A. Stolyar, "Scheduling Algorithms for Mixture of Real-time and NonReal-time Data in HDR," in Proceedings 17th Int. Teletraffic Congress (ITC17) (September 2001). Note that in the EXP-Rule, d refers to head-of-line (HOL) packet delay, i.e., all packets in one queue are assumed to be of the same delay, and each user k has exactly one class of traffic.

As mentioned, a second type of scheduler contemplated by the present invention is a non-real-time MCD (nrt-MCD) scheduler with a rate-based weight function. Real-time users may also be concerned about their long-term resource allocation compared with their profile rate expectation, represented by $$\frac{m_k}{B_k(t)},$$

with $B_k(t)$ determined in accordance with (2), as described above. From a systems point of view, this metric reflects performance fairness, a non-real-time metric. A real-time scheduler, by sacrificing long-term system efficiency for fine-grained, small timescale delay guarantee, may provide poor fairness over a longer period. To protect real-time users that are not time-critical (namely, their packet backlog and current delay are far from delay limit) from excessive packet backlog and efficiency loss, an MCD scheduler with a rate-based weight function $\overline{W}_k(t)$ can be used in a system of the present invention. Such an nrt-MCD scheduler can be implemented as follows:

$$\max_{I_k(t)} \left\{ \max_{\{Q_{k,s}(t), \forall s\}} \overline{W}_k(t) \left[ \sum_{s=1}^{S} \sum_{\forall i \in Q_{x,s}(t)} I_k(t) C_{k,s}^i(t) \right] \right\}, \quad (15)$$

subject to the conditions:

$$\sum_{k=1}^{K} I_k(t) = 1,$$

$$\sum_{s=1}^{S} \sum_{\forall i \in Q_{x,s}(i)} l_{x,s}^i(t) \le r_k(t) \Delta t, \text{ and}$$

$$B_k(t) = \frac{1}{t} \sum_{\tau=1}^{t} r_k(\tau) I_k(\tau).$$

The nrt-MCD scheduler can be implemented in a similar procedure as for the rt-MCD described above. While the intra-user or inter-class cost deduction for each user x finds the most "time-critical" packet subset $\underline{Q}_{x,s}(t)$ as before, the inter-user cost deduction locates the optimal user k*(t) as follows:

$$k^*(t) = \underset{k}{\operatorname{argmax}} \overline{W}_k(t) \left[ \sum_{s=1}^{S} \sum_{\forall i \in Q_{k,s}(t)} I_k(t) l_{k,s}^i(t) \left( 1 + \frac{\gamma \Delta l_{k,s}^i(t)}{l_{k,s}^i(k) + \Delta l_{k,s}^i(t)} \right) \right]. \quad (16)$$

Note that in this nrt-MCD scheduler, a simple and linear function for $W_s(d)$ was assumed in the per-packet cost function $C_{k,s}^i(t)$ Good QoS performance can be achieved with several different weight functions, such as the linear function $$\overline{W}_k(t) = \frac{m_k}{B_k(t)}.$$

An nrt-MCD scheduler with such a weight function is designated herein as nrt-MCD-linear. Given infinite data backlog, such a scheduler is equivalent to a weighted version of the PF algorithm, whose weight is the user-specific profile rate multiplied by the real-time packet delay.

Performance Evaluation

To appreciate the improvement afforded by the present invention over conventional systems, it is helpful to evaluate the joint performance of the CAC and scheduling algorithms of the present invention at both the flow and packet levels, e.g., the achieved system capacity for user accommodation and downlink throughput, and the packet delay/loss metrics for the admitted users.

As an illustrative evaluation of performance of an exemplary implementation of the present invention, a CDMA/HDR downlink channel structure was modeled, with a slot size of $\Delta t = 1.667$ ms, i.e. a scheduling frequency of 600 Hz, and a channel bandwidth of 1.25 MHz. The mean channel distribution was assumed to follow the CDMA/HDR's CDF function, where the mean supportable rate ranges from 153 kbps to 3.767 mbps, while each channel has fast Rayleigh fading and Lognormal Shadow fading with a standard deviation of 4 dB. Without loss of generality and for simplicity, the model assumes only H.263 real-time video streaming (S=1) users at the base station and that each user has only one flow. Each real time flow was modeled as a Bernoulli process with a profile rate of $m_k$=64 kbps. Given the packet size of 128 bytes in HDR systems, the mean packet inter-arrival time is around 16 ms.

Furthermore, a delay budget ($D_s$) of 80 ms was assumed and the HOL packet delay $d_{k,s}^1$ in the cost definition (10) for all backlogged packets of the same user k was used. This simplification reduces the queue management overhead in practice without much difference in performance.

The model assumes CAC is performed in a single cell with a dynamic user population, with users arriving and departing at a certain rate and with each user having a limited lifetime of 40 seconds. Moreover, the mean channel or bandwidth allocations are measured with a time window $t_l$ of 1,000 time slots.

For purposes of comparison, various system combinations of CAC0, CAC1 and CAC2 call admission controllers and Exp-Rule, rt-MCD and nrt-MCD-linear schedulers were modeled. It was discovered that the system combinations with rt-MCD schedulers performed similarly to those with nrt-MCD-linear schedulers.

Figure 2:
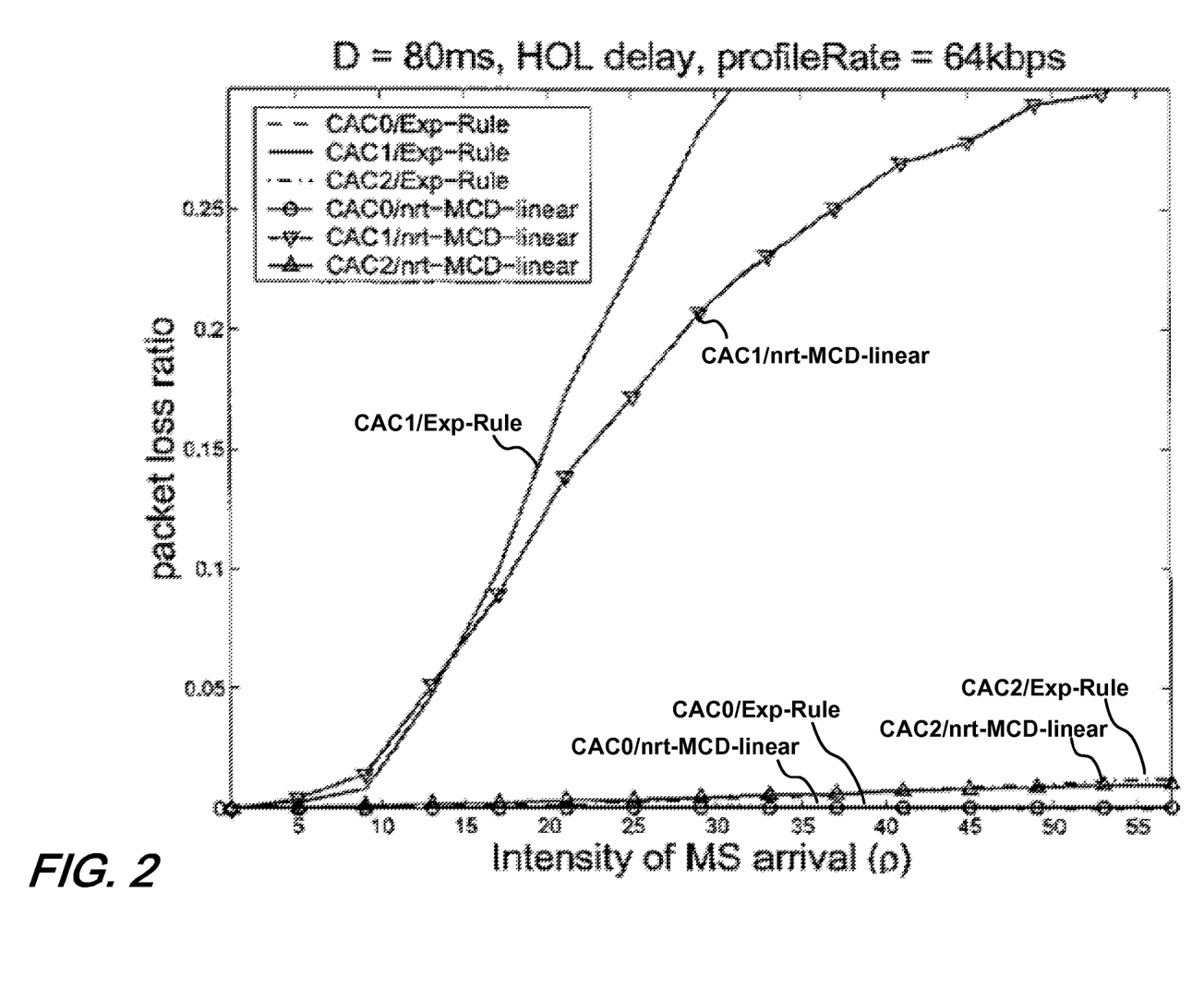
FIG. 2 is graph illustrating the packet loss performance of various embodiments of a system in accordance with the present invention.

FIG. 2 shows the aggregate packet loss ratio for all combinations of a CAC0, CAC1 or CAC2 call admission controller with an Exp-Rule or nrt-MCD-linear scheduler. The aggregate packet loss ratio reflects goodput. As shown in FIG. 2, the two combinations with CAC0 call admission have zero or near-zero packet loss. Such a system, however, will have a low goodput because it will accept too few users. Thus while the use of CAC0 provides perfect or near-perfect packet-level QoS, it leads to low system efficiency or resource utilization. Moreover, the close overlap of the CAC0/Exp-Rule and CAC0/nrt-MCD-linear curves shown in FIG. 2 indicates that such performance is scheduler-independent. This confirms the expectation, discussed above, that CAC0 is the most conservative of the three CAC algorithms described.

FIG. 2 also confirms that CAC1 is the most aggressive of the three CAC algorithms, as shown by the high packet loss ratio for the CAC1/Exp-Rule and CAC1/nrt-MCD-linear curves. Of the three CAC algorithms, CAC1 delivers the highest aggregate goodput (not shown), but at the expense of QoS, as indicated by FIG. 2.

CAC2 provides a good compromise between high goodput and low packet loss. Moreover, as shown in FIG. 2, the packet loss rate for systems implementing CAC2 will not vary significantly between implementations with Exp-Rule and nrt-MCD-linear schedulers.

Figure 3:
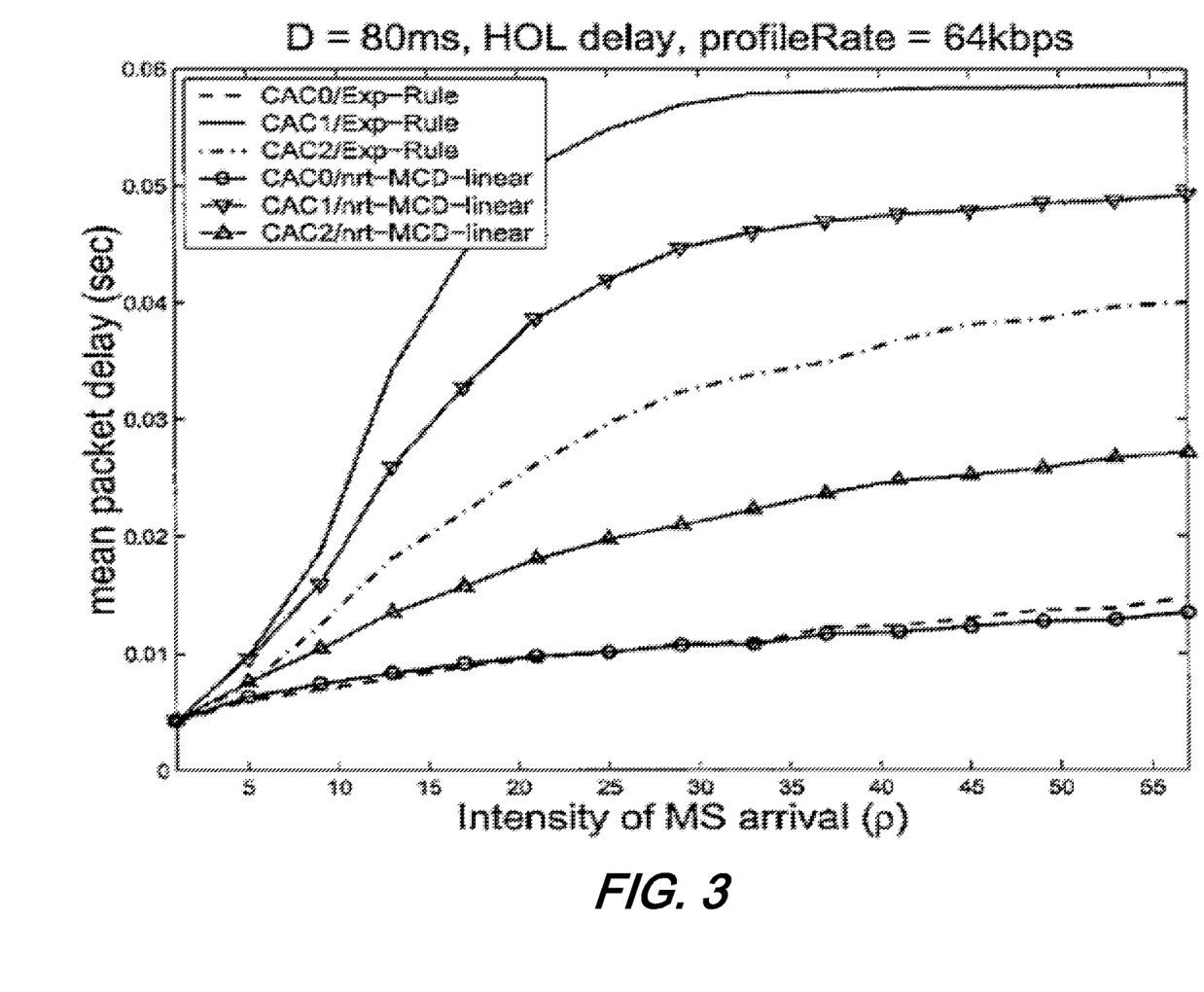
FIG. 3 is graph illustrating the packet delay performance of various embodiments of a system in accordance with the present invention.

FIG. 3 shows the mean delay of successfully transmitted packets, each having a delay budget of 80 ms, for various system configurations. Generally speaking, regardless of the schedulers, CAC0 and CAC1 yield the lowest and highest mean packet delay by virtue of their being overly conservative and aggressive, respectively. As before, the CAC2 performs somewhere in between. FIG. 3 also shows that regardless of CAC algorithm, a system with an nrt-MCD-linear scheduler generally delivers a lower delay than one with an Exp-Rule scheduler. This is consistent with the expectations discussed above.

Figure 4:
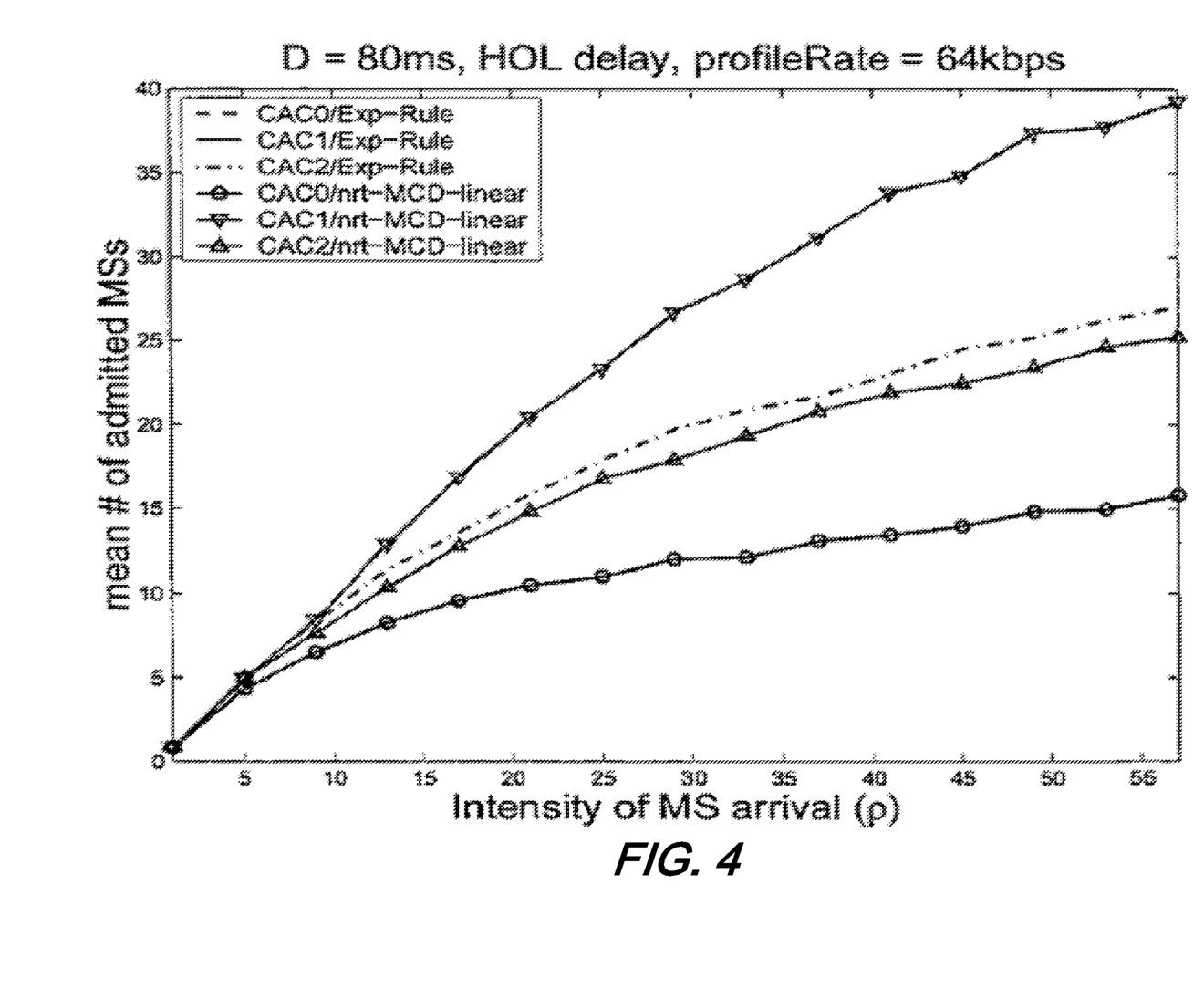
FIG. 4 is graph illustrating the number of admitted users performance of various embodiments of a system in accordance with the present invention.

FIG. 4 shows the average number of admitted users under different combinations of CAC and scheduling algorithms.

The number of admitted users is indicative of the system capacity which is generally the inverse of user blocking rate.

As shown in FIG. 4, of the three CAC algorithms, CAC1 admits the largest number of users (but with higher packet delay and loss) and CAC0 admits the fewest (and thus enjoys good QoS but poor goodput). In contrast, CAC2 essentially admits the "right" number of users supportable by the system, in terms of both packet-level QoSs (e.g., delay and loss) and system efficiency (e.g., goodput).

As shown in FIG. 4, the mean number of admitted users for systems with CAC0 or CAC1 call admission is effectively scheduler-independent. A CAC2/Exp-Rule system can accommodate a few more users than a CAC2/nrt-MCD-linear system.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. An admission control method comprising:
receiving a scheduling decision at a measurement based load estimator for a communications resource;
measuring an existing load of the communication resource based on the scheduling decision;
estimating an additional load of a new user;
combining the existing load measurement and the additional load estimate to determine a combined load;
comparing the combined load to a system capacity; and
admitting the new user if the combined load does not exceed the system capacity, the new user being admitted based on the following relationship:

$$\sum_{k=1}^{K} \frac{m_K}{(K+1)B_k(t)} + \frac{m_i}{E[r_i(t)]} \leq 1,$$

where K is a number of admitted users k, $m_k$ is a profile rate of an admitted user k, $m_i$ is a profile rate of the new user, $E[r_i(t)]$ is an estimated channel rate of the new user at time t, and $B_k(t)$ is an average measure of a communication resource allocated to the admitted user k at time t.

2. The method of claim 1, wherein the scheduling decision is substantially instantaneous.

3. The method of claim 1, wherein measuring the existing load includes measuring a radio resource allocated in accordance with the scheduling decision.

4. The method of claim 1, wherein the communications resource is a shared downlink radio channel.

5. The method of claim 1, wherein:

$$B_k(t+1) = \left(1 - \frac{1}{t_l}\right)B_k(t) + \frac{1}{t_l}r_k(t)I_k(t),$$

where $r_k(t)$ is a channel rate of admitted user k at time t and $I_k(t)$ is the scheduling decision for the admitted user k at time t.

6. The method of claim 1 comprising rejecting the new user if the combined load exceeds the system capacity.

7. The method of claim 1, wherein the method is carried out at a cellular base station.

8. The method of claim 1, comprising generating the scheduling decision.

9. The method of claim 8, wherein the scheduling decision is generated in accordance with a maximum cost deduction (MCD) algorithm.

10. The method of claim 9, wherein the MCD algorithm is a real-time MCD algorithm with a delay-based weight function.

11. The method of claim 10, wherein the delay-based weight function is a linear function.

12. The method of claim 10, wherein the delay-based weight function is an exponential function.

13. The method of claim 9, wherein the MCD algorithm is a non-real-time MCD algorithm with a rate-based weight function.

14. The method of claim 13, wherein the rate-based weight function is a linear function.

15. The method of claim 8, wherein the scheduling decision is generated at a cellular base station.

16. The method of claim 1, wherein the method is carried out at a radio network controller.

17. The method of claim 16, comprising generating the scheduling decision, wherein the scheduling decision is generated at a cellular base station.

* * * * *